United States Patent

Keicher et al.

[11] Patent Number: 5,993,554
[45] Date of Patent: Nov. 30, 1999

[54] MULTIPLE BEAMS AND NOZZLES TO INCREASE DEPOSITION RATE

[75] Inventors: David M. Keicher; W. Doyle Miller, both of Albuquerque, N.Mex.

[73] Assignee: Optemec Design Company, Albuquerque, N.Mex.

[21] Appl. No.: 09/010,673

[22] Filed: Jan. 22, 1998

[51] Int. Cl.⁶ .............................. B05B 5/00; B23K 26/00
[52] U.S. Cl. .................... 118/641; 118/308; 118/315; 219/121.63; 219/121.84
[58] Field of Search .................... 219/121.6, 121.61, 219/121.76, 121.82, 121.84; 118/308, 310, 313, 315, 669, 641; 364/468.01, 468.21, 468.26, 468.27, 469.02; 250/492.1

[56] References Cited

U.S. PATENT DOCUMENTS

| | | | |
|---|---|---|---|
| 4,323,756 | 4/1982 | Brown et al. | 219/121 LF |
| 4,724,299 | 2/1988 | Hammeke | 219/121 L |
| 5,043,548 | 8/1991 | Whitney et al. | 219/121.47 |
| 5,398,193 | 3/1995 | DeAngelis | 364/468 |
| 5,405,660 | 4/1995 | Psiuk et al. | 219/121.66 |
| 5,578,227 | 11/1996 | Rabinovich | 219/121.63 |

OTHER PUBLICATIONS

J.E. Smugeresky et al., "Laser Engineered Net Shaping (Lens®) Process: Optimization of Surface Finish and Microstructural Properties," Jun. 30, 1997, pp. 3–4,10.

J.E. Smugeresky et al., "Using the Laser Engineered Net Shaping (Lens®) Process to Produce Complex Components from a CAD Solid Model," Feb. 12–17, 1997, pp. 7–8.

D.M. Keicher and J. E. Smugeresky, "The Laser Forming of Metallic Components Using Particulate Materials," May 1997, pp. 52–54.

Primary Examiner—David A. Simmons
Assistant Examiner—Calvin Padgett
Attorney, Agent, or Firm—Gray Cary Ware & Freidenrich; Stephen E. Reiter; Ramsey R. Stewart

[57] ABSTRACT

An apparatus and method have been developed to exploit the desirable material and process characteristics provided by a low powered laser material deposition system, while overcoming the low material deposition rate imposed by the same process. One application of particular importance for this invention is direct fabrication of functional, solid objects from a CAD solid model. This apparatus uses a software interpreter to electronically slice the CAD model into thin horizontal layers that are subsequently used to drive the deposition apparatus. This apparatus uses a single laser beam to outline the features of the solid object and then uses a series of equally spaced laser beams to quickly fill in the featureless regions. Using the lower powered laser provides the ability to create a part that is very accurate, with material properties that meet or exceed that of a conventionally processed and annealed specimen of similar composition. At the same time, using the multiple laser beams to fill in the featureless areas allows the fabrication process time to be significantly reduced.

18 Claims, 8 Drawing Sheets

MULTIPLE BEAMS AND NOZZLES TO INCREASE DEPOSITION RATE

BACKGROUND OF THE INVENTION

1. Field of the Invention

This invention relates to the use of multiple beams and nozzles in direct material deposition (DMD) processes in order to increase the deposition rate without compromising material properties or dimensional accuracy.

2. Description of Related Art

Direct material deposition processes allow complex components to be efficiently fabricated in small lot sizes to meet the stringent requirements of the rapidly changing manufacturing environment. This process produces three-dimensional parts directly from a computer aided design (CAD) solid model. U.S. Pat. No. 4,323,756 teaches that complex, net-shaped objects can be built by sequential layer deposition of feedstock material in powder or wire form, whereby the material is directed into a focused laser beam, melted, and deposited onto a deposition substrate to generate solid objects of varying three-dimensional complexity in a layer-wise manner. Other prior art using this method includes "Using the Laser Engineered Net Shaping (LENS™) Process to Produce Complex Components from a CAD Solid Model" by D. M. Keicher et al. in SPIE Conference, San Jose, Calif., January 1997. This method of direct material fabrication uses a single nozzle or powder delivery system that introduces a converging stream of powdered material into the laser beam at or near the beam's minimum diameter (i.e. focus or focal plane). The stream is at an angle off-normal to a deposition surface whereby uniform geometries of three-dimensional objects can be produced by providing computer controlled motion of the deposition surface relative to the laser beam. Experience has shown, however, that this nozzle design does not provide uniform flow independent of the translation direction. In addition, to achieve goal material properties, the deposition rate is sufficiently low, such that fabrication times required for even intermediate volume objects (100 cubic inches) are prohibitive.

U.S. Pat. No. 5,043,548 discloses a laser plasma spraying nozzle and method that permits high deposition rates and efficiencies of finely divided particles of a wide range of feed materials. This system uses powdered materials that are carried to the interaction regions via a carrier gas and lasers to melt these particles. However, this system relies solely on the use of a plasma to melt the particles before they are ever introduced to the deposition region. In fact, the carrier gas is often a mixture which promotes ionization, and, as such, the formation of a plasma. The plasma serves to melt the powder particles before they ever come into contact with the deposition substrate. In addition, the beam is diverging such that when it does impact the deposition substrate, the beam irradiance is sufficiently low so that no melting of the deposition substrate occurs. A great distance between the focal point of the laser and the central portion of the plasma is maintained to prevent the substrate from melting. This distance, ranging from 1–6 inches, is a characteristic of this apparatus. The materials are deposited in either a liquid or gaseous state. This design provides a unique method for coating parts; however, it has never been intended for fabrication of multilayered parts. Due to the diverging nature of the powder material, this plasma technique fails to provide the, feature definition necessary for fabricating complex, net-shaped objects.

Another nozzle design is shown in U.S. Pat. No. 4,724,299. This nozzle design requires the powder to be delivered from an annular source that is coaxial with a single laser beam. This design provides a uniform feed of powder to the cladding region, a laser used as an energy source to melt the powder that is to be deposited, and a powder distribution system. However, this system requires that the powder distribution system be contained within the nozzle assembly.

The nozzle design of the '299 patent is very specific to the laser cladding application. The term laser cladding is used specifically to imply surface modification and not the direct fabrication method. More importantly, the design relies on having an annular powder distribution channel to deliver the powder to the deposition region. The annular powder distribution region provides powder to the focused laser beam from all directions and does not concentrate the powder for a tightly focused powder stream. For a single laser beam that is coaxial to the powder flow, this nozzle should work well to provide a uniform layer, however, there is concern that the powder distribution at the deposition surface is greatest at the center of the deposition region, causing it to diminish radially away from the center of the deposition spot. With this change in powder volume uniformity, the inclusion of multiple beams will certainly result in varying line size for parallel deposited lines.

U.S. Pat. No. 4,323,756 also covers the direct metal deposition (DMD) process. This technique uses both wires and powders as filler material. It also uses a single laser beam to deposit the various materials. This patent teaches that the volume of the feedstock material must be less than that of the melted substrate material. However, this reduces the rate of deposition and increases the time to produce parts. The requirement to limit the volume of the feedstock material to be less than that of the melted substrate material was driven by the desire to remove impurities and obtain epitaxial growth. Instead of removing impurities by continuously remelting the previously deposited materials, impurities can be efficiently eliminated by performing the deposition in a controlled atmosphere environment, such as a glove box. Furthermore, expitaxial growth is not desired in most three-dimensional parts, since it may result in anisotropic material characteristics. For most general applications, uniform material properties are desired that do not limit the feedstock volume to be less than that of the deposition substrate melted region.

The above single laser nozzle's side design lacks the ability to increase the deposition rate of powder without sacrificing vital process conditions, including reduced residual stress, enhanced material properties, process time, and good dimensional repeatability, as well as feature definition. Also, this nozzle design does not provide uniform flow independent of the translation direction. Therefore, such nozzle designs are not suitable for mass 3-D net-shape production.

U.S. Pat. No. 5,578,227 contains similarities to the present invention, such as the use of a positioning system to direct the location of deposition, and the use of a laser to deposit the feedstock material. However, the '227 patent only uses a single laser beam for the deposition process, which uses wire as the feedstock material. This patent also claims that the laser causes the feedstock material to bond to the previously deposited layer without substantially altering the cross-section of the newly deposited material. Such a continuous form of material would appear to be prone to substantial problems of warpage and distortion of the deposited layers due to an incomplete melting of the feedstock material. For the powder deposition processes, the feedstock material is completely consumed within the 3-D net shape, with the powder's cross-section being substantially altered.

Accordingly, there exists a need for improved material deposition nozzles for the laser assisted deposition process.

OBJECTS OF THE INVENTION

Accordingly, several objects and advantages of the present invention are:

(a) to provide multiple beams and nozzles within a single system which will increase the deposition rate without compromising process conditions or time;

(b) to provide multiple beams and nozzles within a single system which will increase the volume usage rate of feedstock;

(c) to provide multiple beams and nozzles within a single system which will reduce residual stress within parts by using more lower powered, finely focused laser beams in a single system;

(d) to provide multiple beams and nozzles within a single system which will achieve good dimensional repeatability and feature definition by using more lower powered, finely focused laser beams in a single system;

(e) to provide multiple beams and nozzles within a single system which can create uniform material properties in parts that do not limit the feedstock volume to be less than that of the deposition substrate melted region;

(f) to provide multiple beams and nozzles within a single system which can form streams of particles that are partially or completely melted and can then be consumed to become part of a solid structure;

(g) to provide multiple beams and nozzles within a single system that allow for the use of either a single laser beam or any combination of laser beams during any part of the process;

(h) to provide for powder filler nozzles that can be used in a combination of one, two, three, or four pairs, depending on the needs of the design.

Still further objects and advantages will become apparent from a consideration of the ensuing description and drawings.

BRIEF DESCRIPTION OF THE INVENTION

The present invention provides an apparatus for the use of multi-beams and nozzles in the deposition of materials to form three-dimensional parts whereby the deposition rate increases. The deposition head assembly consists of the following features: an array of output powder nozzles for creating a converging flow of powder to the deposition region, a central orifice which allows the multiple beams to be focused onto the deposition substrate, and coaxial gas flow for each of the powder nozzles to concentrate the stream of powders from these nozzles in order to provide a longer working distance between the nozzle and the deposition head assembly. The longer working distance is critical to insure that molten metal particulates are not attached to the deposition apparatus during processing. In particular, the invention includes a manifold system designed into the deposition head assembly that can use more than one laser beam simultaneously for the deposition process. The deposition head assembly also incorporates a means for actively concentrating the powder stream from each orifice to increase material utilization efficiency.

The use of multiple beams and nozzles within a single system allows an increase in the deposition rate without compromising the process conditions or time. The present invention will increase the volume of feedstock used in a given time. The use of more than one laser beam allows for lower powered, finely focused laser beams to be used in order to minimize residual stress within parts. This characteristic also achieves good dimensional repeatability and feature definition.

The present invention also provides a means for using either a single laser beam or any combination of laser beams during any part of the process.

DETAILED DESCRIPTION OF THE INVENTION

Figure 1:
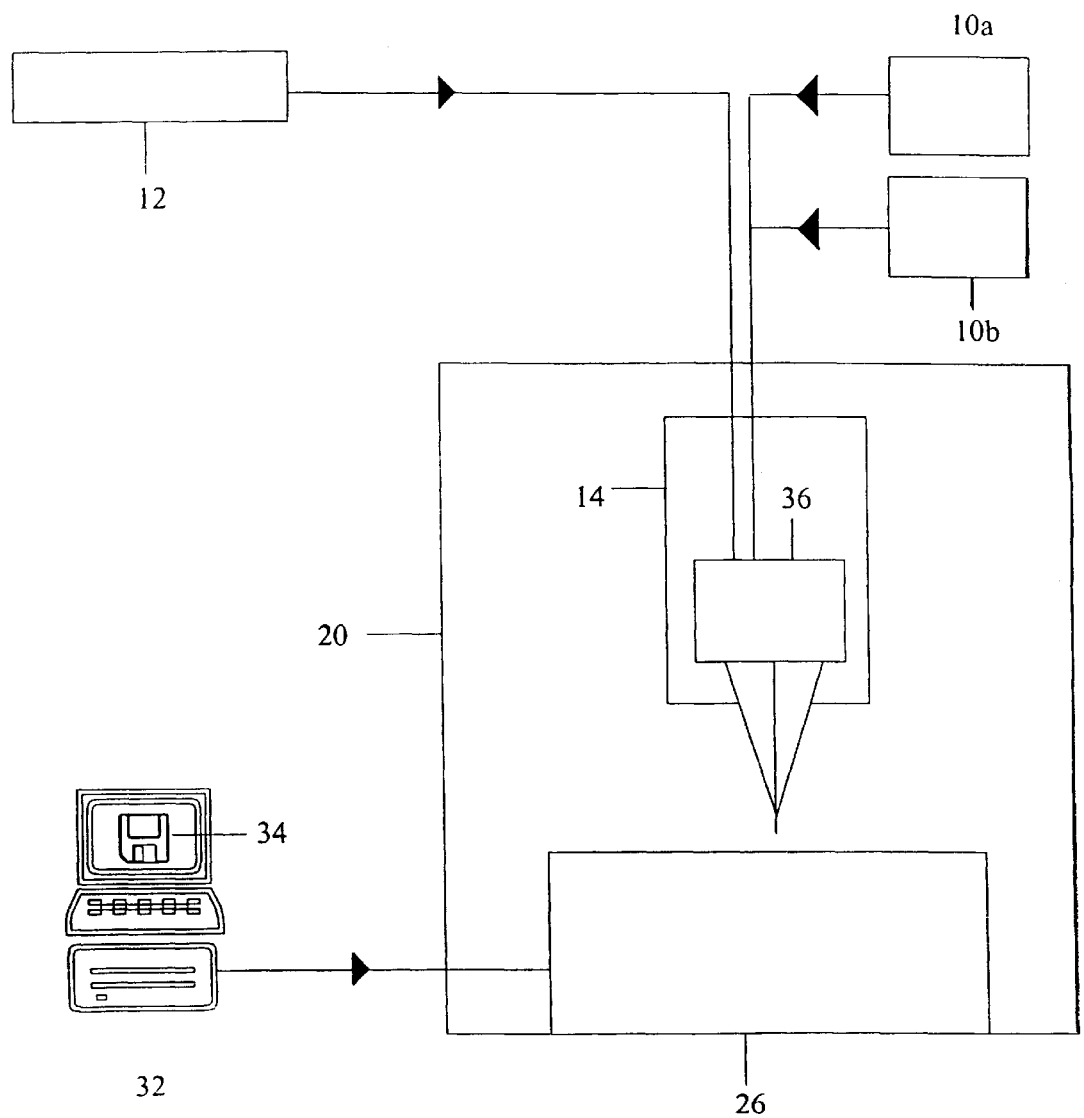
FIG. 1 schematically illustrates the position of the present invention within a material deposition system.

A schematic of the preferred embodiment of this invention is given in FIG. 1, showing the position of the invention within a direct material deposition system. The system includes: a powder feeding apparatus 10, to deliver a uniform flow of powder to the deposition region; a laser 12, to cause heating and subsequent melting of the powder feed particles; and a deposition head/heads 36. The system also includes a set of orthogonal positioning stages 26, which are computer driven to direct the location of deposition; a vertical stage 14; a computer 32, on which software 34 is used to slice the CAD solid models and generate a motion control program to control deposition processing sequence based on CAD file data; and a sealed chamber 20, to contain the powder particles during processing and provide an inert environment.

Figure 2A:
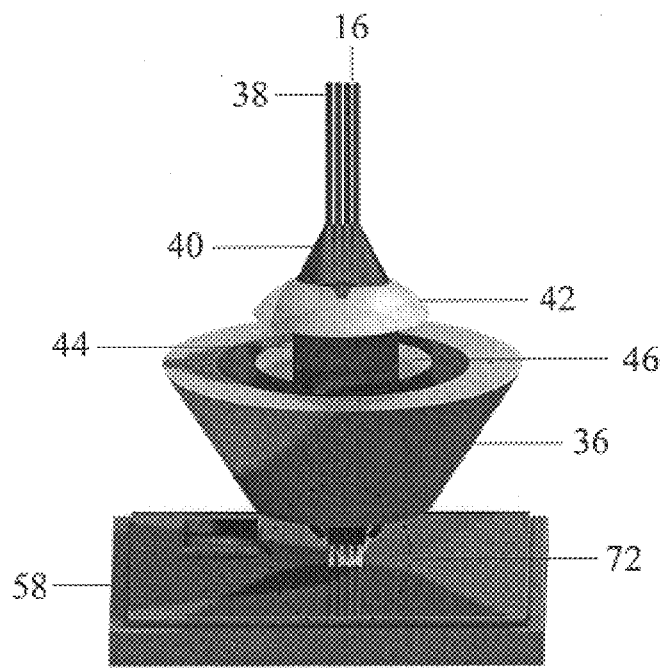
FIG. 2A shows a three-dimensional front view of the multi beam apparatus without the manifold, and a substrate.
Figure 2B:
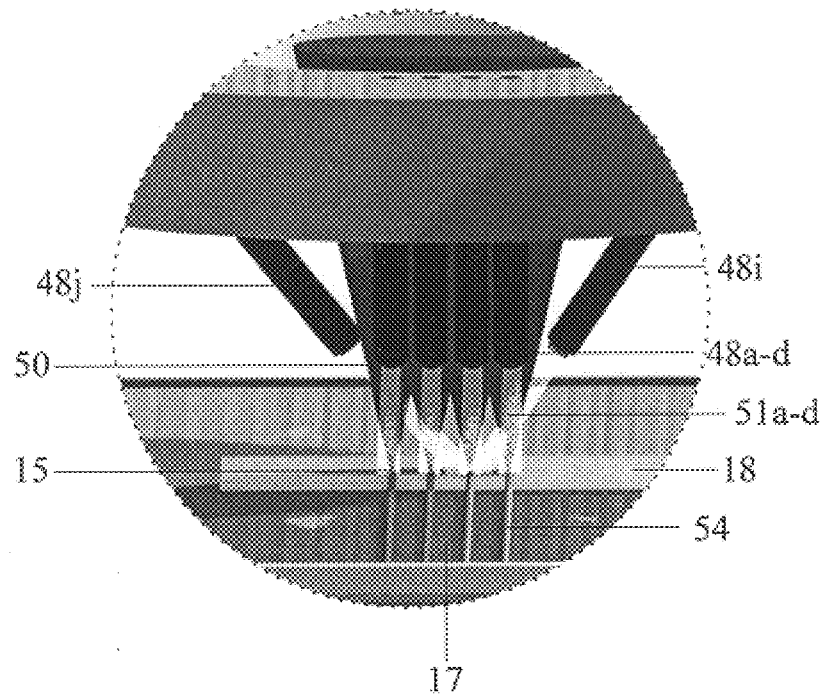
FIG. 2B is an enlarged front view of powder nozzles according to one embodiment of the present invention.

Referring to FIGS. 2A and 2B the multi beam deposition apparatus begins with four beam delivery fibers 38, that are equally spaced apart at a prescribed distance 16, which are used to transport the laser beams to the deposition apparatus. The beams out of the fiber are divergent laser beams 40 and transmitted through the spherically shaped collimating lens 42. The laser beams then leave the collimating lens 42 as collimated laser beams 44 located above the deposition head 36. These collimated laser beams 44 are then transmitted through a second spherically shaped focusing lens 46 to be focused onto the deposition substrate 58. The focused laser beams 50 create a linear array of focused laser spots 15 on the deposition substrate 58. The focus plane 18 of the focused laser spots is located at/or near the deposition substrate, which is also the same as the deposition substrate 58. This spacing between the focused laser spots 17 is dictated by the prescribed distance 16 between the beam delivery fibers 38 and the magnification provided by the imaging system created by the combination of the collimating lens 42 and the focusing lens 46.

For this configuration, the deposition head is conical in shape. An array of powder nozzles 48 project from underneath the deposition head 36. Streams of powder 51a–d exit from the powder nozzles 48 and interact with the focused laser beams 50 to form line deposits 54 on a deposition substrate 58.

Figure 3:
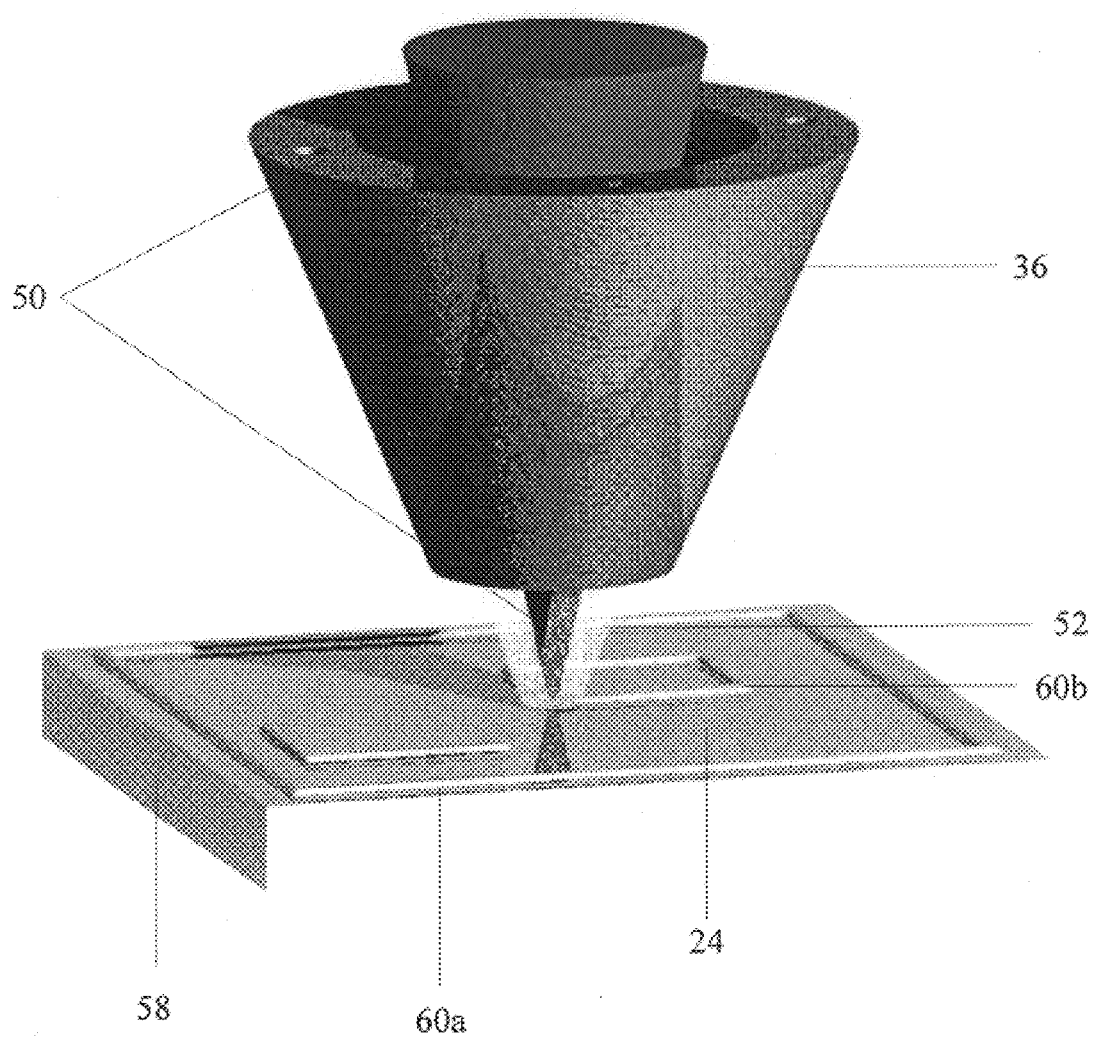
FIG. 3 is a three-dimensional front view of the deposition head and the deposition substrate.

FIG. 3 shows the relationship between the focused laser beams 50, the powder 52, and the deposition substrate 58. The focused laser beams 50 are shown both above and below the deposition head 36. The powder 52 and focused laser beams 50 then interact below the deposition head 36 in order to form features 60 on the deposition substrate and to deposit material in the region between the features to form a uniform solid layer of material. For this process, the internal deposited features 60b and external deposited features 60a on the deposition substrate 58 serve to define the geometry of the component being fabricated as well as provide boundaries for the fill region 24.

Figure 4A:
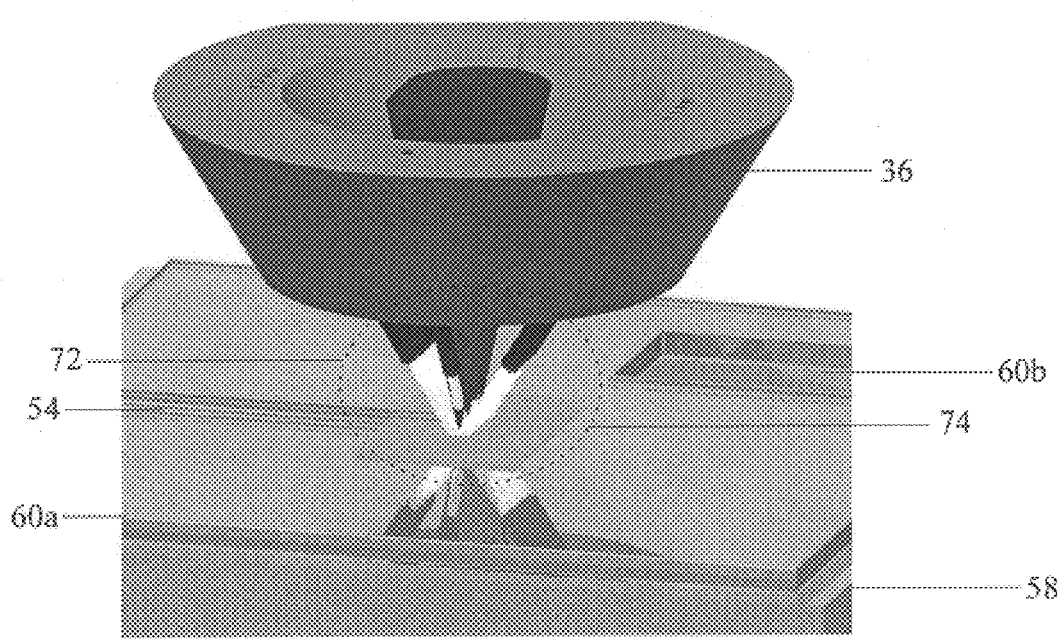
FIG. 4A is a three-dimensional close-up of the powder nozzles and deposition substrate.
Figure 4B:
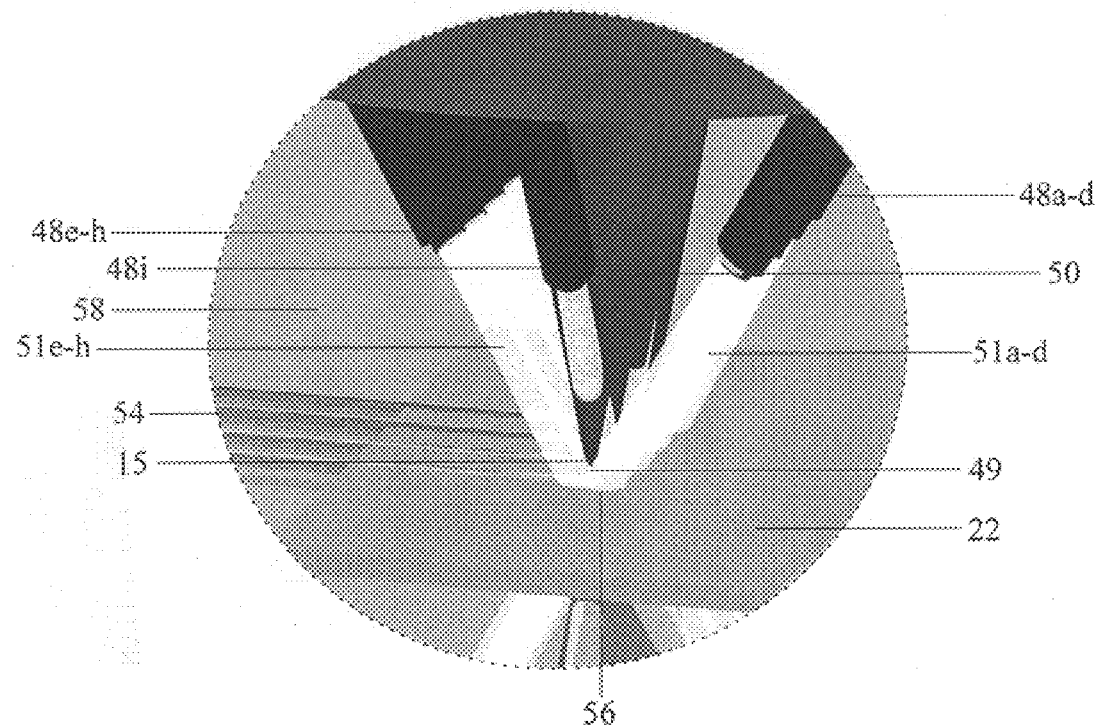
FIG. 4B is an enlarged side view of powder nozzles according to one embodiment of the present invention.

Referring to FIGS. 4A and 4B, the multi beam deposition apparatus includes eight filler powder nozzles 48a–h and two outline powder nozzles 48i–j, of which only one is shown 48i, that project from the deposition head 36. Streams of powder 51a–h are ejected from the powder nozzles 48a–h. The eight filler powder nozzles 48a–h are positioned within the deposition head 36 such that the stream of powder 51a–d from one filler powder nozzle 48a–d intersects with the stream of powder 51e–h from a second filler powder nozzle 48e–h from an opposing direction. In this fashion, the streams of powder 51 from two of the eight powder filler nozzles 48 interact to form a pair of filler powder nozzles whose powder streams form a powder convergence point 49 on the deposition substrate 58. The convergence plane 22, which cuts through the intersection of the powder streams from the nozzles and is orthogonal to the propagation direction of the laser beams, is located at or near, the deposition plane, which parallels the top surface of the orthogonal positioning stages 26, as shown in FIG. 1. From these eight filler powder nozzles 48a–h, four pairs of filler powder nozzles interact to form four powder convergence points 49. The powder convergence points 49 can be described as the location where the area circumscribed by one powder nozzle overlays the area circumscribed by the second powder nozzle forming, one pair of interacting powder nozzles. The four powder convergence points form a linear pattern on the substrate and are separated by a distance equal to the spacing of the focused laser spots 17, as shown in FIG. 2B. These powder convergence points 49 are located so that the elliptical pattern circumscribed by the powder convergence point 49 is concentric with one of the focused laser spots 15.

All powder nozzles, regardless of whether they are outline powder nozzles 48i–j or filler powder nozzles 48a–h, join the focused laser beams 50 in the interaction zone 56. However, not all types of powder nozzles are always working at the same time. Outline powder nozzles 48i–j interact with one pair of the filler powder nozzles 48a–h to provide powder that is used to form external deposited features 60a and internal deposited features 60b. Filler powder nozzles 48a–h then operate independently of the outline powder nozzles 48i–j to provide streams of powder 51a–d that form the uniform deposited solid material layer between the boundaries created by various combinations of external deposited features 60a and internal deposited features 60b. Each of the focused laser beams 50 has independent on-off control to allow the length of each of the layer fill lines to be varied independently. This feature permits the solid material layers to be formed within regions whose external deposited features 60a or internal deposited features 60b do not conform to the linear front or the width of the deposition region formed by the linear array of focused laser spots 15. Each of the line deposits 54 can be sequenced on or off as the various line deposits intersect external deposited features 60a or internal deposited features 60b, allowing material to be deposited in desired regions only.

Figure 5:
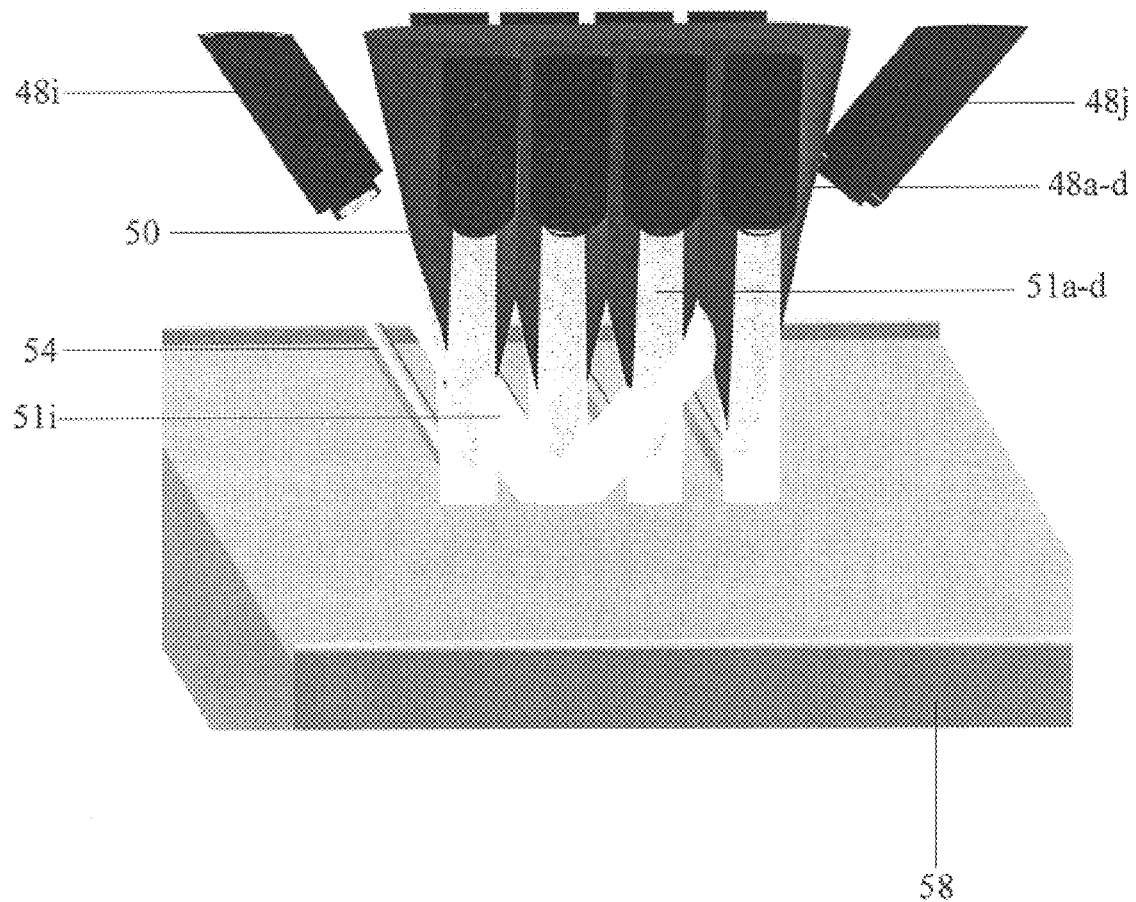
FIG. 5 is a close-up frontal view of the multi-beam fill deposition approach, showing the two outline powder nozzles.

FIG. 5 shows a close-up frontal view of the multi-beams and nozzles in contrast to FIG. 4B. In this diagram, the outline powder nozzles 48i–j are shown to be directed to interact with only one pair of the filler powder nozzles 48a–h. This geometry allows uniform deposition of the external deposited features and internal deposited features independent of the direction of motion of the deposition substrate 58 relative to the deposition head. The powder to the outline nozzles 48i–j is directed at the deposition surface only when the external deposited features and internal deposited features are being formed. Otherwise, powder is not flowing from the outline powder nozzles 48i–j.

Figure 6:
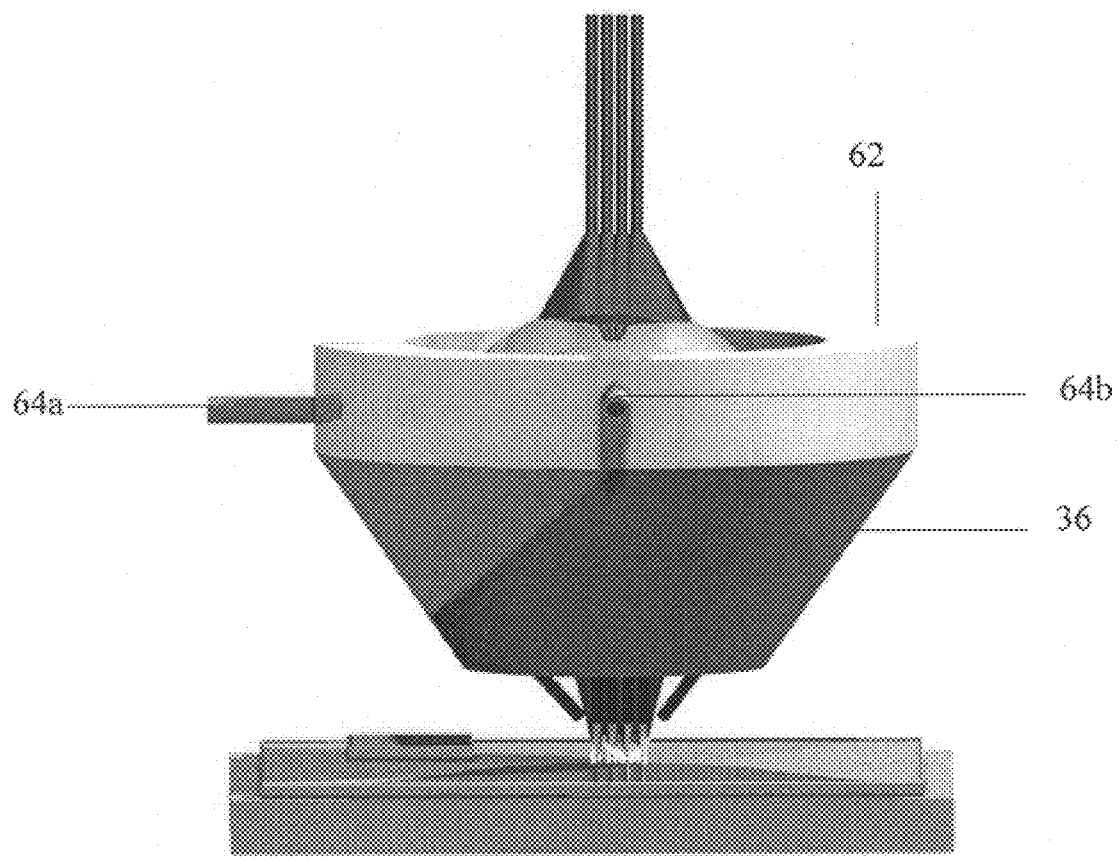
FIG. 6 is a three-dimensional front view of the multi-beam apparatus with the manifold.

FIG. 6 shows the multi-beam deposition apparatus with a manifold 62 and powder inlet tubes 64a–b. For this apparatus, the powder is delivered to the deposition head 36 via a carrier gas. This gas can be inert or reactive depending on the specific application. Once the powder is entrained in the gas stream, it is introduced into the deposition head 36 through the powder inlet tubes 64a–b. The powder then exits the deposition head 36 through the filler powder delivery tubes 70a and the outline powder delivery tubes 70b, as shown in FIGS. 7A and 7B.

Figure 7A:
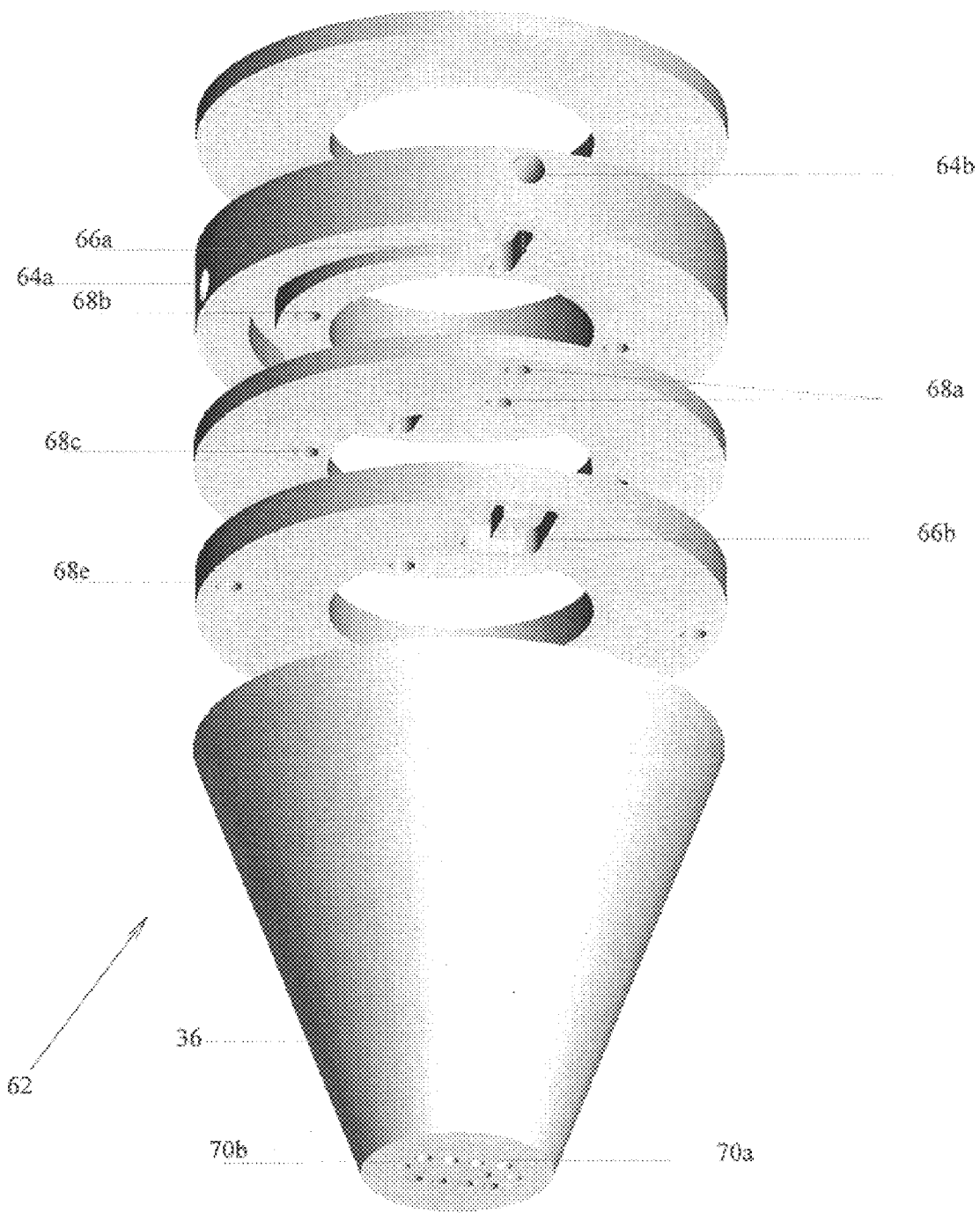
FIG. 7A is a three-dimensional isometric bottom view of the manifold system connected to the deposition head.
Figure 7B:
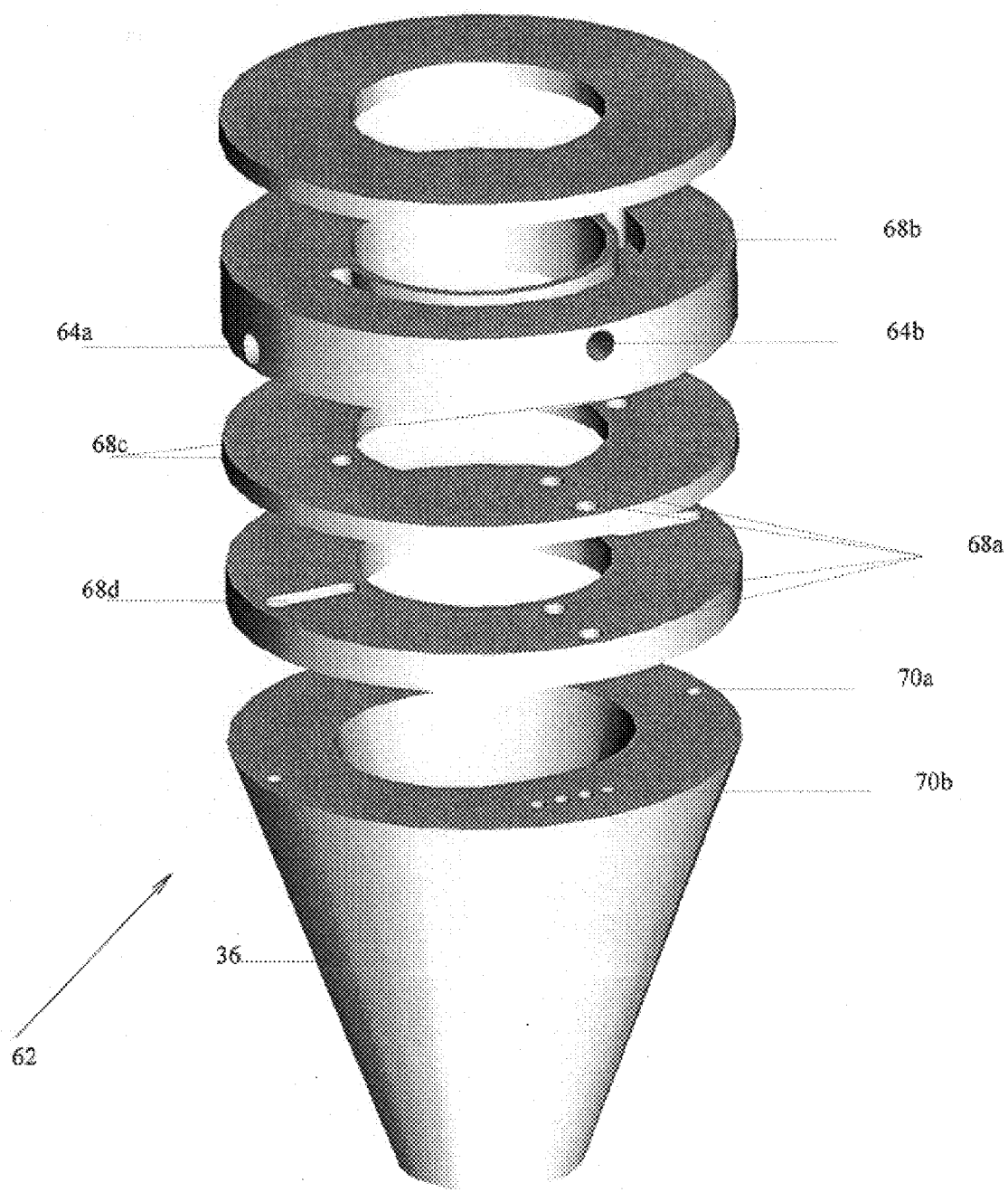
FIG. 7B is a three-dimensional isometric top view of the manifold system connected to the deposition head.

The internal structure of the manifold system 62 is shown in FIGS. 7A and 7B. The powder is injected into the filler powder inlet tube 64a and enters into a manifold system 62 that separates the powder into eight approximately equal parts. To separate the powder into eight approximately equal parts, two series of separation channels 66a–b and an orifice 68a are used. The powder first enters the deposition head 36 through the filler powder inlet tube 64a and is separated into two approximately equal parts. One half of the powder is then carried through the first filler powder separation channel 66a. At the end of this filler powder separation channel 66a, the powder is again separated into two approximately equal parts and directed through the filler powder layer-connecting orifice 68a. After passing through the orifice 68a, the powder is directed down through the deposition head 36 to exit out of the deposition head through the filler powder delivery tubes 70a and finally out the filler powder nozzles. The path for the outline powder is similar to that for the filler powder. A second powder feed unit is used to meter the powder for the outline powder nozzles. The powder used for the outline powder nozzles first enters the deposition head 36 through the outline powder inlet tube 64b and is separated into two approximately equal parts. One half of the powder is then carried through the outline powder separation channel 66c. At the end of this channel 66c, the powder is directed downward through a series of outline powder layer connecting orifices 68b–e, exiting the deposition head 36 through the outline powder delivery tubes 70b, and finally out of the outline powder nozzles, onto the top surface of the deposition substrate. The powder flow rate from the second powder feed unit is metered to be approximately equal to one fourth of the total quantity of powder delivered to the filler powder nozzles. This method of powder separation relies principally on the path lengths for each of the nozzles to be approximately equal with an equal pressure drop at each nozzle.

This invention can be explained in terms of the multiple nozzle deposition apparatus and the multiple laser beam deposition apparatus. The multiple nozzle deposition apparatus has been developed for the application of powdered materials onto a substrate to create a uniform fused layer in a desired pattern with exceptional material properties, very good dimensional accuracy, and at a rate that is practical for the direct fabrication of solid objects. In the preferred embodiment, four beam delivery fibers 38 transmit approximately equally powered laser beams that become four focused laser beams 50 that are used as heat sources to melt the powder supplied to the deposition region, where it is fused to the deposition substrate 58, as shown FIGS. 2A, 2B and 6. For this invention, the number of focused laser beams 50 is not nearly as important as the concept of using multiple beams to achieve normally conflicting requirements of a high deposition rate coupled with exceptional material properties and very good dimensional accuracy. The trend among current research groups has been to focus on using a single laser beam with increased power to achieve the higher deposition rates. Although the high-powered laser beam does allow these groups to achieve the high deposition rates, the results reported for material properties and dimensional accuracy are poor. Conversely, using a lower powered laser beam of several hundred watts has allowed solid parts to be made with increased material strength and ductility with very good accuracy. This is the cornerstone upon which this invention builds.

For the multiple beam deposition apparatus, two powder feeding apparatus 10a–b are used to supply powdered materials to the deposition head 36, as shown in FIG. 1. The powdered material from these sources can be either gravity fed or, preferably, carried to the deposition region via a carrier gas. The carrier gas can be inert or reactive with the powder material. The powder is entrained in a gas stream and brought into the multiple beam deposition apparatus through either of the two powder inlet tubes 64a–b, as shown in FIG. 6, FIG. 7a, and FIG. 7b. The two different powder feeding apparatus 10a–b supply powder for either the filler powder nozzles 48a–h or the outline powder nozzles 48i–j. The manifold 62 serves to separate the powder input to the deposition apparatus into approximately equal parts for the deposition process. For the filler powder, the powder enters the powder separation manifold 62 through the filler powder inlet tube 64a and is directed onto the wall of the powder passage. The collisions of the powder with the passage wall along with the length of each passage being approximately equivalent for each of the nozzles serves to separate the powder into approximately equal parts for the deposition process. After being separated into several parts, the gas entrained powder material exits from the multiple beam deposition apparatus from a series of nozzles located in the base of the multiple beam deposition apparatus. In a similar fashion, the powdered material from the second powder feeding apparatus 10b is separated into two approximately equal parts and directed out of the multiple beam deposition apparatus from the outline powder nozzles 48i–j. The volume of powder output from the filler powder nozzles and the outline powder nozzles is controlled to be equivalent by monitoring the volumetric powder flow out of the two powder feeding apparatus 10a–b.

Referring to FIG. 4, each of the filler powder nozzles 48a–h is located within the multiple beam deposition apparatus, such that the powder stream out of one filler powder nozzle interacts with the powder stream from a second filler powder nozzle to create a plane of convergence 22. This plane of convergence 22 is similar to the focal plane of one of the focused laser beams 50 from the multiple beam deposition apparatus. Deposition of the powdered material occurs in a plane ±0.5 inches above or below his plane of convergence 22. Referring to the multiple beam deposition apparatus in the description section, each of the filler powder nozzles 48a–d interacts with only one other filler powder nozzle 48e–h to create four pairs of filler powder nozzles whose powder convergence planes are located at a similar position from the multiple beam deposition apparatus. In a similar fashion, the outline powder nozzles 48i–j are located within the multiple beam deposition apparatus such that the powder stream from each of these nozzles interacts to form a convergence plane 22. This convergence plane 22 is located at a similar distance from the deposition apparatus as is the convergence plane formed by the filler powder nozzles 48a–h. It should be noted that the convergence plane of the intersecting powder streams from the outline powder nozzles is similar to that for the filler powder nozzle pairs, and the convergence point of the intersecting powder streams from the outline powder nozzles is co-located with the convergence point created by the powder from one pair of filler powder nozzles. During the outline process, the center pair of filler powder nozzles interact with the outline nozzles to provide uniform flow from all four directions, simulating a Cartesian coordinate. The convergence plane created by the interacting outline powder nozzles 48i–j forms the plane at or near the plane where the material deposition will occur.

In the convergence plane, each pair of the filler powder nozzles 48a–h interacts to form an elliptical spot that has the maximum powder density in its central region. One of the focused laser beams is directed through this location of maximum powder density such that the focused laser beam is centered within the elliptical spot formed by the two powder nozzle streams. This is similar for each of the filler powder nozzle pairs, each pair having one laser beam. Each of the laser beams interacts with both powdered materials and the deposition substrate 58 to cause the powdered material to become molten and be fused/bonded to the surface of the deposition substrate 58. The elliptical spot created by the interacting outline powder nozzles 48i–j is located to be coincident with the elliptical spot created by one set of the filler powder nozzles and the focused laser beam that passes through this spot. In this fashion, a single deposition head 36 can be used to both outline features and then fill in the featureless regions in an expeditious fashion. The powder flowing to the outline powder nozzles 48i–j is only flowing to the deposition region where feature outlining will occur. During the feature outline deposition process, only the focused laser beam that interacts with the filler powder nozzles aligned with the outline powder nozzles is transmitted to the deposition surface. In this fashion, the uniform fill layer thickness can tie preserved and the outline layer thickness can be made uniform to the fill layer thickness by control of the transverse rate of the deposition substrate 58 relative to the focused laser beam. Although the embodiment described uses a single deposition head for the material deposition application, this operation can also be performed using multiple deposition heads 36 with one or more powder feeding apparatus.

The present invention can be used for material cladding, surface modification, and other processes where the addition of a layer or region of material is required. One application of particular importance in using the multiple beam deposition apparatus involves building a solid object from the powdered material one layer at a time. This direct fabrication application will be used to describe the general operation of the deposition system that incorporates the multiple beam deposition apparatus. For the direct fabrication application, a computer aided design (CAD) solid model of the component to be fabricated is used. The CAD solid model, which represents the component in its entirety, is first sectioned into thin layers within the computer. This operation is generally referred to as a slicing operation. Each of these layers represents a cross-section of the component at a given distance away from the base of the component, including a hatching pattern that defines the regions to be filled during the deposition process. The hatching pattern includes a series of equally spaced parallel lines that are used to define the line deposition regions within the areas to be filled.

Referring to FIG. 2, the deposition process is similar to a printing process in which a thick printed layer is deposited. The computer transforms the layer information into a series of control commands for the deposition process. Typically, the outline of the feature is deposited first using the outline powder nozzles 48*i–j* and the filler powder nozzles 48*a–h* that coincide. The deposition substrate 58 is located beneath the multiple beam deposition apparatus and the outline process is initiated by turning on the outlining beam and moving the part relative to the beam to outline both the internal and external features required for each layer. The outline layers can have a varying thickness in comparison to the fill layers. Then the flow of powder to the outline powder nozzles 48*i–j* is stopped and the filling process occurs. The filler powder nozzles 48*a–h* interact with the focused laser beams 50 to create lines that are equally spaced apart such that an integer number of lines will exactly fill the regions between the lines. The first series of lines is deposited. Next, the substrate 58 is translated relative to the deposition head 36 such that a second set of lines can be deposited alongside the first set of lines. The operation continues until the space between the first set of equally spaced parallel lines is completely filled with material, creating a flat layer with a uniform thickness. After this region is filled, the substrate 58 is again translated relative to the deposition head 36 to begin to fill the region adjacent to the first fill region. The fill process is repeated until the space between the first set of equally spaced parallel lines in the second region is filled, once again creating a flat layer with a uniform thickness, which is also equal to the thickness of a line deposit 54. This process is repeated across the layer until the entire area requiring material has been filled. Once this layer is deposited, the multiple beam deposition apparatus is translated away from the deposition plane, a distance equal to the thickness of the flat layer. This entire process is repeated to deposit subsequent layers in a sequential manner, until the finished object is completed.

It is also possible to have different scan patterns for alternating layers, while maintaining the process time advantage of multiple beams and nozzles. This is achieved by rotating the orientation of the deposition surface relative to the deposition head 36 about the axis, which is normal to the deposition surface. For example, if a Cartesian coordinate system is used to define the three-dimensional space above the substrate, where the deposition substrate lies in the X, Y plane, then the rotation would occur about the Z-axis. This is desired in some parts because it creates a uniform heating within the part that results in uniform stress throughout the part.

Independent control of the focused beams 50 transmitted to the surface of the deposition substrate 58 allows each beam to be modulated on and off independent of the other beams. During the filling operation for each layer, each of the beams is turned on and off as the deposition lines intersect the external deposited feature 60*a* and internal deposited features 60*b*. In this fashion, the filling process can be controlled to fill the areas where material is required and leave void those areas that do not require material. One alternative to leaving certain regions void is to apply a second material which is sacrificial and used only as a support structure material.

While this invention has been described as having a preferred design, it is understood that it is capable of further modifications, uses and/or adaptations of the invention, following in general the principle of the invention and including such departures of the present disclosure as come within known or customary practice in the art to which the invention pertains, and as may be applied to the central features hereinbefore set forth, and fall within the scope of the invention of the limits of the appended claims.

We claim:

1. An apparatus for increasing a material deposition rate onto a substrate without affecting the dimensional or material properties of the substrate, said apparatus comprising:

at least one deposition head having at least one laser inlet, at least one laser outlet, and at least one powder nozzle a laser source which sends one or more laser beams to each of said laser inlets of said deposition head for passage through said laser outlet(s), and a computer containing software comprising a motion control algorithm, wherein said powder nozzle(s) serves as an exit point for applying a feedstock powder to said substrate, wherein said laser beam(s) exit said laser outlet(s) to interact with the powder exiting said powder nozzle(s), said interaction occurring between said laser outlets of the deposition head and said substrate, thereby depositing feedstock material in a predetermined pattern on said substrate, and wherein said deposition of said feedstock in said predetermined pattern is under the control of said computer.

2. The apparatus of claim 1, further comprising a manifold assembly connected to said deposition head for providing approximately equal distribution of powdered material to at least one set of powder delivery tubes.

3. The apparatus of claim 2, wherein said manifold assembly comprises:

one or more powder inlet tube(s);

one or more powder separation channels, wherein each of said powder separation channels is connected to said powder inlet tube(s) for receiving powder from said powder inlet tube(s);

one or more layer-connecting orifices, wherein each layer-connecting orifices is connected to a corresponding powder separation channel for receiving powder therefrom; and one or more powder delivery tubes, wherein each of said powder delivery tubes is connected to a corresponding layer-connecting orifice for receiving powder therefrom and for delivering powder to said powder nozzle (s).

4. The apparatus of claim 3, wherein said deposition head contains at least one powder nozzle.

5. The apparatus of claim 3, wherein said powder enters said manifold assembly through said powder inlet tube, traveling through said separation channel, into said layer-connecting orifice, and said powder splits into approximately equal distributions into the next separation channel or directly into said powder delivery tube, whereby an equal powder volume is supplied to each powder delivery nozzle, thereby providing a uniform amount of powder to said substrate from each of said powder delivery nozzles.

6. The apparatus of claim 1, wherein said deposition rate is increased due to the use of multiple laser beams with multiple powder nozzles thereby resulting in multiple line deposits simultaneously on the same part.

7. The apparatus of claim 6, wherein said multiple laser beams each use the same low power, less than 1000 watts, whereby a lower heat input into said part produces less residual stress and better material properties, including increased strength and increased ductility due to fine grain structure.

8. The apparatus of claim 7, wherein multiple laser beams have a fine beam diameter that produces a small laser spot size and better resolution, whereby dimensional properties are accurate.

9. The apparatus of claim 1, wherein a plurality of filler powder nozzles and a pair of outline powder nozzles are all located in a single deposition head, in which one or more feedstock materials exiting said pair of outline powder nozzles will converge with one or more feedstock materials exiting one pair of said filler powder nozzles, in a single laser beam.

10. The apparatus of claim 9, wherein said outline powder nozzles and a single pair of filler powder nozzles are located in one deposition head wherein said pair of filler powder nozzles function as outline powder nozzles to simulate a Cartesian coordinate during the outline process, while one or more additional filler powder nozzles are located in a second deposition head.

11. The apparatus of claim 1, further comprising at least one powder feeding apparatus, from which powdered material enters said manifold assembly.

12. The apparatus of claim 11, wherein a second powder feed unit is used to meter the flow rate from said second powder feeding apparatus, thereby providing powdered material to said outline powder nozzles in an amount approximately equal to the total quantity of powder delivered to a single pair of said filler powder nozzles.

13. The apparatus of claim 1, wherein said computer software is used to produce information from a CAD data source in order to control the deposition process.

14. The apparatus of claim 1, wherein said computer controls translation of a deposition surface relative to said multiple laser beams to provide material deposition within selected regions.

15. The apparatus of claim 1, wherein the multiple laser beams can be modulated on and off independent of the other beams.

16. The apparatus of claim 15,
wherein said motion control algorithm receives data from a CAD solid model and wherein said software transforms said data into a series of control commands for the deposition process.

17. The apparatus of claim 15, wherein a single laser beam or any combination of laser beams can be used during any part of the process.

18. The apparatus of claim 1, wherein said laser source is connected to one or more beam delivery fibers for delivering said multiple laser beams.

\* \* \* \* \*

UNITED STATES PATENT AND TRADEMARK OFFICE
CERTIFICATE OF CORRECTION

PATENT NO.   : 5,993,554
DATED        : November 30, 1999
INVENTOR(S)  : David M. Keicher et al.

It is certified that error appears in the above-identified patent and that said Letters Patent is hereby corrected as shown below:

<u>Title page,</u>
Item [73], Assignee, "Optemec Design Company" should read -- Optomec Design Company --.

Signed and Sealed this

Eighteenth Day of November, 2003

JAMES E. ROGAN
*Director of the United States Patent and Trademark Office*